UNITED STATES PATENT OFFICE.

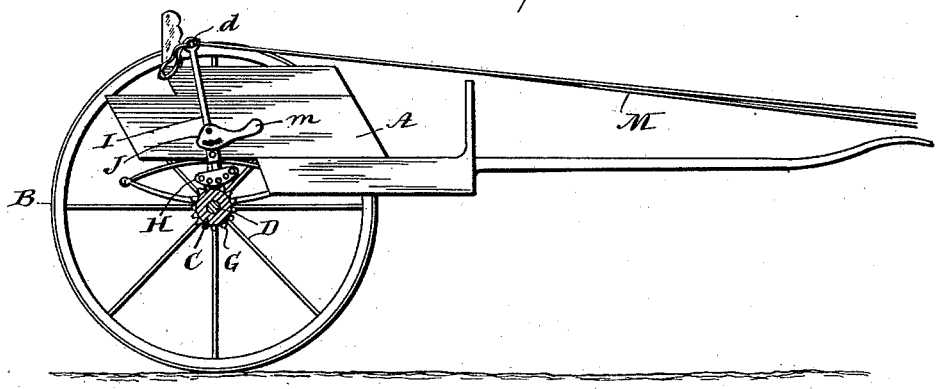

JOHN SIEBEL, OF OSKALOOSA, IOWA.

HORSE-ARRESTER.

SPECIFICATION forming part of Letters Patent No. 463,000, dated November 10, 1891.

Application filed January 27, 1891. Serial No. 379,243. (No model.)

*To all whom it may concern:*

Be it known that I, JOHN SIEBEL, of Oskaloosa, in the county of Mahaska and State of Iowa, have invented a new and useful Horse-Arrester, of which the following is a full, clear, and exact description.

The object of this invention is to provide a simple, practical, and inexpensive device for application to wheeled vehicles which will automatically arrest a draft-animal that is standing hitched to the vehicle if it attempts to start or to run away while the vehicle is in motion.

To this end my invention consists in the construction and combination of parts, as is hereinafter described and claimed.

Reference is to be had to the accompanying drawings, forming a part of this specification, in which similar letters of reference indicate corresponding parts in all the views.

Figure 1 is a side elevation of a wheeled vehicle having the device applied, parts of one of the wheels being removed and the axle shown in section. Fig. 2 is an enlarged detail side elevation of the arrester device with the wheel-hub in transverse section on the line 2 2 in Fig. 3, the upper end of the arrester-lever being broken away; and Fig. 3 is a rear elevation of a vehicle-wheel and a portion of the axle with the arrester device in position thereon, the upper end of the arrester-lever being broken away.

The improvement can be applied to any vehicle provided with either four or two wheels. For convenience it is shown in connection with a road-cart, of which A is the body, B one of the wheels, and C the hub of the opposite wheel, the latter-named part being connected to the arrester.

Upon the axle D of the vehicle an upright standard E is secured by clamping-bolts or other means, and has a vertical guide-box F pivotally secured thereto at $a$ near its upper end and upon the outer side, so as to align said tubular guide-box with a toothed wheel G, formed upon or secured to the inner end of the hub C of one of the vehicle-wheels, as shown in Figs. 2 and 3. The guide-box F is located at such a proportionate distance above the gear-wheel G as will permit the introduction between the same of a gear-segment H, preferably formed as shown, and consisting of two curved plates $b$, held spaced apart by tooth-bars $c$, which are secured by their ends in spaced perforations formed in the plates near their curved edges, so as to adapt the teeth of the wheel G to have an interlocking engagement with the tooth-bars when the latter are lowered into a position to effect such a connection of parts. The gear-segment H is provided with a supporting-bar I, that is of such dimensions in cross-section as will adapt it to slide in the guide-box F, through which it passes, and projects vertically a proper distance having a fork or loop $d$ (shown in Fig. 1) formed on its upper end to which the driving-reins may be removably secured when the device is in service.

On the side of the bar I which is adjacent to the wheel of which C is the hub a cam-lever J is pivoted. Said lever has a flat head-plate, through which the pivot-bolt $e$ is inserted, and has a curved slot $g$ formed near one edge below the pivot-bolt, which is eccentrically located with regard to said bolt, thus producing a cam-slot wherein a stud $h$ is inserted loosely, which stud projects from the adjacent side of the guide-box F. It will be evident that a downward movement of the handle $m$ of the cam-lever J will cause the gear-segment H to engage the wheel G, as shown in Fig. 1, a reverse movement elevating the gear-segment, so as to release the arresting device from the wheel.

In service the cam-lever J is retained in the position shown in Figs. 2 and 3 while the vehicle is in motion and the animal under control of the driver. Should an emergency require that the horse be checked by other means than manual force, the reins M may be quickly attached to the upper end $d$ of the supporting-bar I and the gear-segment H thrown into gear with the wheel G, which latter by its revolution will rock the bar I rearwardly or away from the animal, the bar being guided in its movements by the stud $h$ traveling in the slot of the cam-lever J, so that a quick and forcible draft strain will be applied to the reins M and an immediate arrest of the animal will result. If the animal is liable to be frightened or inclined to run away when left standing without an attendant, the cam-lever J should be depressed and the gear-segment H thus thrown into engagement with the wheel G, the reins M being secured to the end $d$ of the bar I. Should the horse become restive or frightened and attempt to start, a partial revolution of the gear-wheel G, caused by the movement of the vehicle, will throw the supporting-bar I rearward and check the animal instantly. This arresting device obviates the necessity for hitching the horse to a post or the use of a heavy weight attached to a halter.

Having thus fully described my invention, what I claim as new, and desire to secure by Letters Patent, is—

In a horse-arrester, the combination, with a vehicle having a toothed wheel on the hub of one of its wheels, of a standard secured to the axle, a guide-box pivoted to the upper end of the standard and provided with a projecting stud, a bar working in the guide-box, a segmental gear secured to the lower end of the said bar, and a lever pivoted to the bar and provided with a curved slot, in which works the stud of the guide-box, substantially as herein shown and described.

JOHN SIEBEL.

Witnesses:
   C. W. JONES,
   S. H. FOREMAN.